United States Patent
Zhao et al.

(10) Patent No.: US 10,777,231 B2
(45) Date of Patent: Sep. 15, 2020

(54) EMBEDDING THUMBNAIL INFORMATION INTO VIDEO STREAMS

(71) Applicant: Intel Corporation, Santa Clara, CA (US)

(72) Inventors: Bo Zhao, Shanghai (CN); Yunbiao Lin, Shanghai (CN); Yue Xiong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/161,700

(22) Filed: Oct. 16, 2018

(65) Prior Publication Data
US 2019/0066735 A1 Feb. 28, 2019

Related U.S. Application Data

(63) Continuation of application No. 14/125,151, filed as application No. PCT/CN2012/086784 on Dec. 17, 2012, now abandoned.

(51) Int. Cl.
*G11B 27/34* (2006.01)
*H04N 21/81* (2011.01)
(Continued)

(52) U.S. Cl.
CPC ............ *G11B 27/34* (2013.01); *G11B 27/102* (2013.01); *G11B 27/3081* (2013.01);
(Continued)

(58) Field of Classification Search
CPC ... G11B 27/34; G11B 27/3081; G11B 27/102; H04N 21/8153; H04N 21/85406; H04N 21/8455
See application file for complete search history.

(56) References Cited

U.S. PATENT DOCUMENTS 7,194,701 B2 3/2007 Stavely
7,552,387 B2 6/2009 Shen
(Continued)

FOREIGN PATENT DOCUMENTS

CN 1913614 A 4/2007
CN 101601287 A 12/2009
(Continued)

OTHER PUBLICATIONS

CN office action in corresponding CN application No. 201280077101.8 dated May 17, 2017, 17 pages.
(Continued)

*Primary Examiner* — Anthony Bantamoi
(74) *Attorney, Agent, or Firm* — Trop, Pruner & Hu, P.C.

(57) ABSTRACT

Methods and systems may provide for embedding thumbnail information into a video file such as a clip, stream, recording, and so forth. The thumbnail information may include, for example, a representative image of the video content in the file, an index to a key frame in the video content, or any combination thereof. If the thumbnail information includes the representative image, the representative image may be embedded at a predetermined location in the file. If the thumbnail information includes the index to a key frame, the index may be embedded in a header of the file.

12 Claims, 4 Drawing Sheets

(51) Int. Cl.
*H04N 21/845* (2011.01)
*H04N 21/854* (2011.01)
*G11B 27/10* (2006.01)
*G11B 27/30* (2006.01)

(52) U.S. Cl.
CPC ..... *H04N 21/8153* (2013.01); *H04N 21/8455* (2013.01); *H04N 21/85406* (2013.01)

(56) References Cited

U.S. PATENT DOCUMENTS

| | | |
|---|---|---|
| 7,685,163 B2 | 3/2010 | Chaudhri |
| 9,277,198 B2 | 3/2016 | Fay |
| 9,449,644 B2 | 9/2016 | Yoshimine |
| 9,514,785 B2 | 12/2016 | Bargas |
| 2004/0095396 A1* | 5/2004 | Stavely ............... G09C 5/00 |
| 2004/0220322 A1* | 11/2004 | Shen ................... H04N 7/16 |
| 2004/0221322 A1 | 11/2004 | Shen |
| 2006/0064716 A1 | 3/2006 | Sull |
| 2007/0237493 A1 | 10/2007 | Hall |
| 2008/0134094 A1 | 6/2008 | Samadani |
| 2008/0263448 A1 | 10/2008 | Oppenheimer |
| 2009/0006189 A1 | 1/2009 | Zhang |
| 2009/0110363 A1 | 4/2009 | Kim |
| 2009/0119736 A1 | 5/2009 | Perlman |
| 2009/0132599 A1* | 5/2009 | Soroushian ........... G06F 17/30 |
| 2009/0083781 A1 | 9/2009 | Yang |
| 2010/0050124 A1* | 2/2010 | Douillet ............... G06F 3/048 |
| 2010/0071017 A1* | 3/2010 | Woodley ............. H04N 7/173 |
| 2010/0269147 A1* | 10/2010 | Zetterower ........... H04N 7/173 |
| 2011/0267538 A1 | 11/2011 | Dharssi |
| 2011/0312375 A1 | 12/2011 | Kim |
| 2012/0054615 A1 | 3/2012 | Lin |
| 2012/0070125 A1 | 3/2012 | Lin |
| 2012/0134421 A1 | 5/2012 | Liguori |

FOREIGN PATENT DOCUMENTS

| | | |
|---|---|---|
| CN | 101971625 A | 2/2011 |
| EP | 2385528 A1 | 11/2011 |
| JP | 3992042 | 7/2005 |
| KR | 101745625 | 6/2017 |
| WO | 2007105876 A1 | 9/2007 |

OTHER PUBLICATIONS

CN office action in corresponding CN application No. 201280077101.8 dated Jan. 30, 2018 (19 pages).
CN 3rd office action in corresponding CN application No. 201280077101.8 (PCT/CN2012/086784) dated Oct. 25, 2018 (27 pages).
PCT Search Report and Written Opinion in corresponding application No. PCT/CN2012/086784 dated Aug. 22, 2013 (10 pages).
Extended EP Search Report in corresponding application No. EP 12890236.8-1905 /2932703 dated Apr. 19, 2016 (7 pages).
National Intellectual Property Administration of the People's Republic of China, Decision on Rejection dated May 20, 2019 in Chinese Patent Application No. 201280077101.8.

\* cited by examiner

FIG. 7

EMBEDDING THUMBNAIL INFORMATION INTO VIDEO STREAMS

CROSS-REFERENCE TO RELATED APPLICATIONS

This application is a continuation of U.S. patent application Ser. No. 14/125,151 filed on Dec. 10, 2013, which is a 317 of PCTCN2012/086784 filed Dec. 17, 2012.

BACKGROUND

When a user of an electronic device browses or previews video files on the device, a video decoder of the device's operating system (OS) may select multiple frames from each file for decoding and potential display one of the decoded video frames as a thumbnail image of the file in question. If the format of the video file is not natively supported by the OS video decoder, however, a generic thumbnail image may be displayed, which can prevent the user from easily determining the content of the underlying video. Even if the format of the video file is natively supported, the selected frame for the thumbnail image may not be representative of the video content (e.g., shows a meaningless scene or portion of a scene). Moreover, different operating systems may use different algorithms to select the representative frame, which may lead to inconsistent results from the perspective of the user. Additionally, decoding multiple candidate frames for each video file can increase power consumption and create delays in the browsing process. Increased power consumption may be particularly problematic for mobile devices in which battery life is an area of concern.

BRIEF DESCRIPTION OF THE DRAWINGS

Some embodiments are described with respect to the following figures.

DETAILED DESCRIPTION

Embodiments may include a computer readable storage medium having a set of instructions which, if executed by a processor, cause a computer to identify a file containing video content. The instructions, if executed, may also cause a computer to identify thumbnail information for the video content, and embed the thumbnail information into the file containing the video content.

Embodiments may also include a method that involves identifying a file containing video content and identifying thumbnail information for the video content, wherein the thumbnail information includes one or more of a representative image and an index to a key frame in the video content. The method may also provide for embedding the thumbnail information into the file containing the video content. If the thumbnail information includes the representative image, the representative image may be embedded at a predetermined location in the file. If the thumbnail information includes the index to a key frame, the index may be embedded into a header of the file.

Embodiments may also include a computer readable storage medium having a set of instructions which, if executed by a processor, cause a computer to receive a browse request associated with a file containing video content. The instructions, if executed, may also cause a computer to identify thumbnail information in the file and display a thumbnail image based on the thumbnail information.

Embodiments may also include a system having a battery to provide power to the system, and an input module to receive a browse request associated with a file containing video content. The system may also include a thumbnail module to identify thumbnail information in the file, and an output module to display a thumbnail image based on the thumbnail information.

Figure 1:
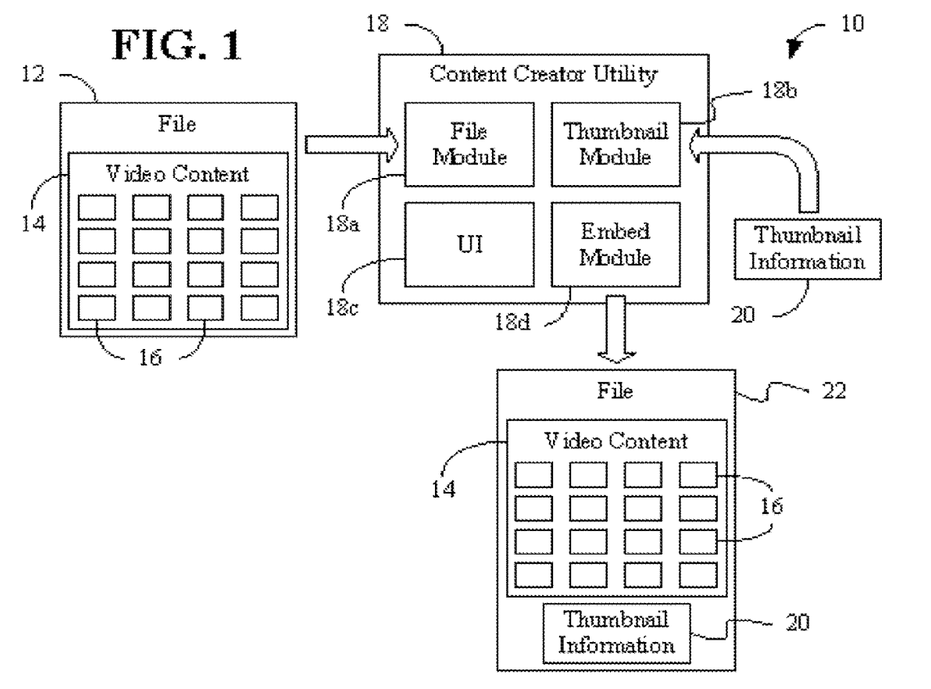
FIG. 1 is a block diagram of an example of a video file modification architecture according to an embodiment.

Turning now to FIG. 1, an architecture 10 to modify video files is shown. In the illustrated example, a file 12 contains video content 14, wherein the video content 14 may include a plurality frames 16 representing captured scenes, subjects, images, and so forth, at different moments in time. The file 12 may therefore be a video clip, video stream, video recording, etc., suitable for decoding and display on a display device such as a monitor, projector, screen, and so forth (not shown). The frames 16 may be encoded according to a video format such as, for example, MP4 (Moving Picture Experts Group 4 Part 14), AVI (Audio Video Interleave), 3GP (Third Generation Partnership), etc., wherein no thumbnail image is incorporated into the video content 14 itself. Accordingly, a content creator utility 18 (18a-18d) may be used by a creator/producer of the video content 14 to embed thumbnail information 20 into the file 12.

More particularly, the illustrated utility 18 includes a file module 18a to identify the file 12 and a thumbnail module 18b to identify the thumbnail information 20. As will be discussed in greater detail, the thumbnail information 20 may include, for example, a representative image associated with the video content 14 (e.g., poster, advertisement, trailer, announcement), an index to one or more key frames (e.g., intra coded frames/I-frames) within the video content 14, etc., or any combination thereof. The thumbnail module 18b may work in conjunction with a user interface (UI) 18c to obtain the thumbnail information 20 based on user input. The illustrated utility 18 also includes an embed module 18d that embeds the thumbnail information 20 into the file 12 to obtain a modified file 22. Of particular note is that the thumbnail information 20 can enable the video content 16 to be browsed/previewed without concern over inconsistent results, power consumption, battery life or delays.

Figure 2A:
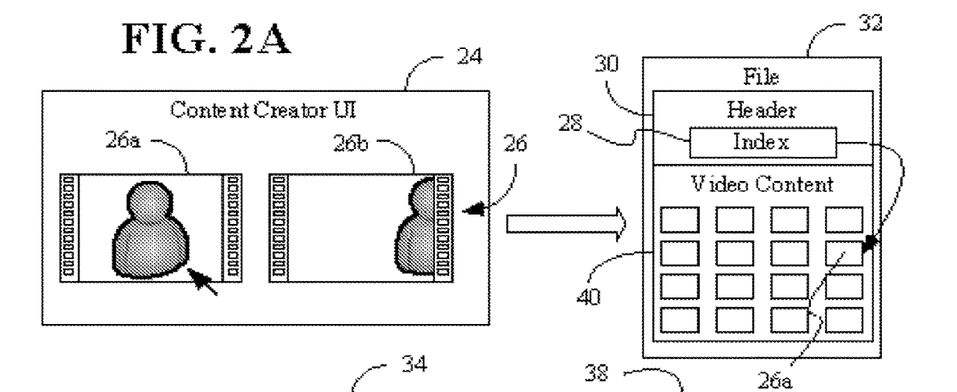
FIGS. 2A and 2B are block diagrams of examples of video file modification user interfaces according to embodiments.

FIG. 2A shows one approach to a UI 24 of a content creator utility such as the utility 18 (FIG. 1), already discussed. The illustrated UI 24, which may be readily substituted for the UI 18c (FIG. 1), presents multiple key frames 26 (26a, 26b) to the user and enables the user to select/designate one or more of the key frames 26 as a source of a thumbnail image, wherein the key frames 26 may be generated via I-frame encoding. In this regard, I-frame encoding uses predictions that are constrained within the frame (i.e., predictions do not reference other frames). Thus, I-frame encoding may be particularly useful for generating thumbnail images because no other frames may be needed in the decoding process. In the illustrated example, the user selects a first key frame 26a that is more representative of the underlying video content 40 than a second key frame 26b, which conveys very little information to the viewer by itself (i.e., because the subject is not fully shown).

Additionally, an index 28 to the selected key frame 26a may be added to a header 30 of a file 32 containing the video content 40 so that subsequent file browsers may readily determine which frame to use as the source of a thumbnail image. Thus, the index 28 may constitute thumbnail information that ensures the same key frame is used for the thumbnail image regardless of the OS decoder being used, reduces power consumption because only one key frame is decoded by the OS decoder, extends battery life, and reduces display time.

Figure 2B:
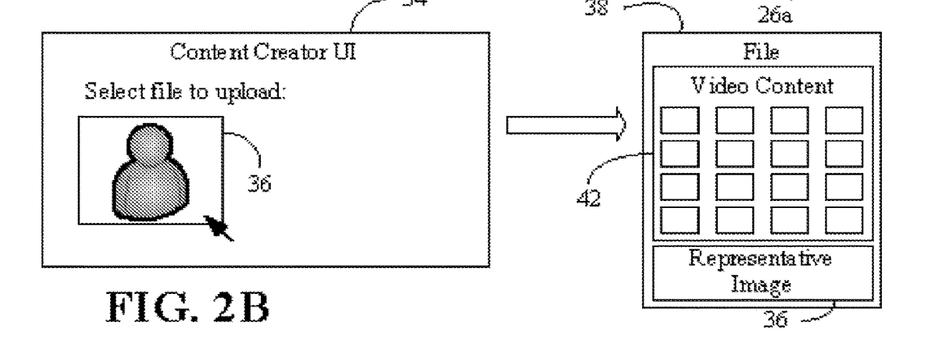

FIG. 2B shows another approach to a UI 34 of a content creator utility such as the utility 18 (FIG. 1), already discussed. The illustrated UI 34, which may be readily substituted for the UI 18c (FIG. 1), enables the user to upload one or more representative images 36 to be used as a thumbnail image. In the illustrated example, the user uploads the representative image 36, which may or may not be an actual scene or frame of the video content 42, into the utility. The utility may then embed the representative image 36 at a predetermined location in a file 38 containing the video content 42. The predetermined location may be any location within the file 38 that is agreed upon by both the encoding/producing entity and the decoding/displaying entity. The representative image 36 may have a resolution that is different from (i.e., greater or less than) the resolution of the video content 42, depending upon the circumstances. Thus, the representative image 36 may constitute thumbnail information that ensures the same representative image 36 is used for the thumbnail image regardless of the OS decoder being used, reduces power consumption because no frame decoding is conducted by the OS decoder, extends battery life, and reduces display time.

Figure 3:
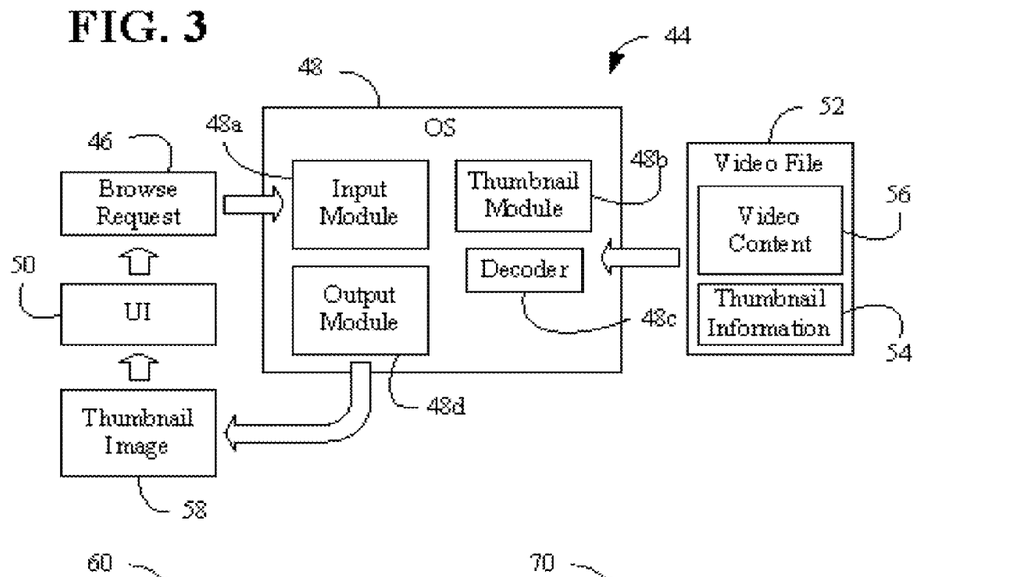
FIG. 3 is a block diagram of an example of a video file browsing architecture according to an embodiment.

Turning now to FIG. 3, an architecture 44 to browse/preview video files is shown. In the illustrated example, a user issues a browser request 46 associated with a video file 52 to an OS 48 (48a-48d) via a UI 50 (e.g., touch screen interface, keyboard, keypad, mouse, touch pad, microphone, display, etc.), wherein the browser request 46 might correspond to the user opening a "gallery" component of the OS 48 that references the file 52, opening a folder that contains the file 52, scrolling a file listing that contains the file 52, and so forth. The OS 48 may include an input module 48a that receives the browse request 46 and a thumbnail module 48b that identifies thumbnail information 54 in the file 52, which contains video content 56.

In one example, the thumbnail information 54 may include an index to a key frame in the video content 56, wherein the index is embedded in a header of the file 52. In such a case, a decoder 48c of the OS 48 may decode the indexed key frame and an output module 48d of the OS 48 may display a thumbnail image 58 based on the decoded key frame. In another example, the thumbnail information 54 includes one or more representative images that are embedded at a predetermined location in the file 52. In such a case, the thumbnail module 48b may simply retrieve the representative image and provide it to the output module 48d for display as the thumbnail image 58. As already noted, the resolution of the representative image may be different from the resolution of the video content 56. The thumbnail information 54 may also include both an index to one or more key frames and one or more representative images, depending upon the circumstances.

Figure 4:
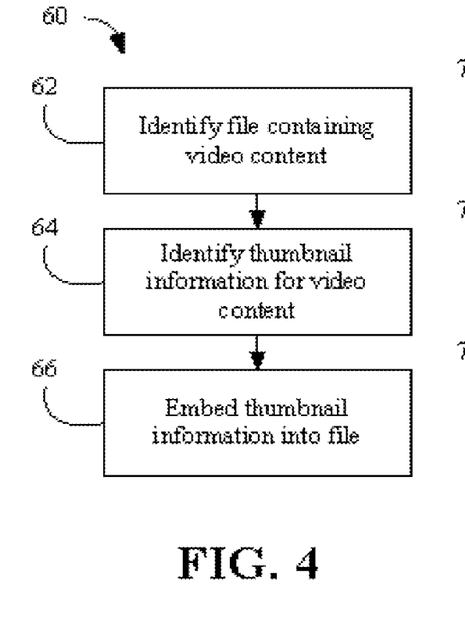
FIG. 4 is a flowchart of an example of a method of modifying video files according to an embodiment.

FIG. 4 shows a method 60 of modifying video files. The method 60 may be implemented in executable software as a set of utility logic instructions stored in a machine- or computer-readable storage medium of a memory such as random access memory (RAM), read only memory (ROM), programmable ROM (PROM), firmware, flash memory, etc., in configurable utility logic such as, for example, programmable logic arrays (PLAs), field programmable gate arrays (FPGAs), complex programmable logic devices (CPLDs), in fixed-functionality utility logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 60 may be written in any combination of one or more programming languages, including an object oriented programming language such as Java, Smalltalk, C++ or the like and conventional procedural programming languages, such as the "C" programming language or similar programming languages.

Illustrated processing block 62 provides for identifying a file containing video content, wherein the file may be a video clip, stream, recording, and so forth. Thumbnail information may be identified at block 64. The thumbnail information might include, for example, an index to one or more key frames in the video content, one or more representative images, etc., or any combination thereof. Block 66 may embed the thumbnail information into the file.

Figure 5:
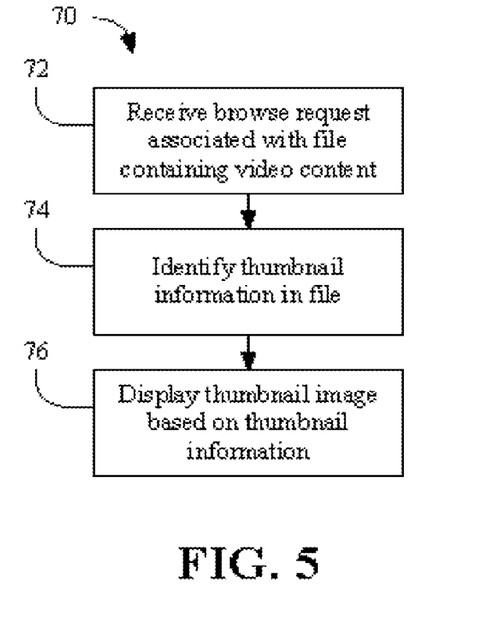
FIG. 5 is a flowchart of an example of a method of browsing video files according to an embodiment.

FIG. 5 shows a method 70 of browsing/previewing video files. The method 70 may be implemented in executable software as a set of preview logic instructions stored in a machine- or computer-readable storage medium of a memory such as RAM, ROM, PROM, firmware, flash memory, etc., in configurable preview logic such as, for example, PLAs, FPGAs, CPLDs, in fixed-functionality preview logic hardware using circuit technology such as, for example, ASIC, CMOS or TTL technology, or any combination thereof. Illustrated processing block 72 provides for receiving a browse request associated with a file containing video content, wherein thumbnail information may be identified in the file at block 74. The thumbnail information might include, for example, an index to one or more key frames in the video content, one or more representative images, etc., or any combination thereof, as already discussed. Block 76 may display a thumbnail image based on the thumbnail information.

Figure 6:
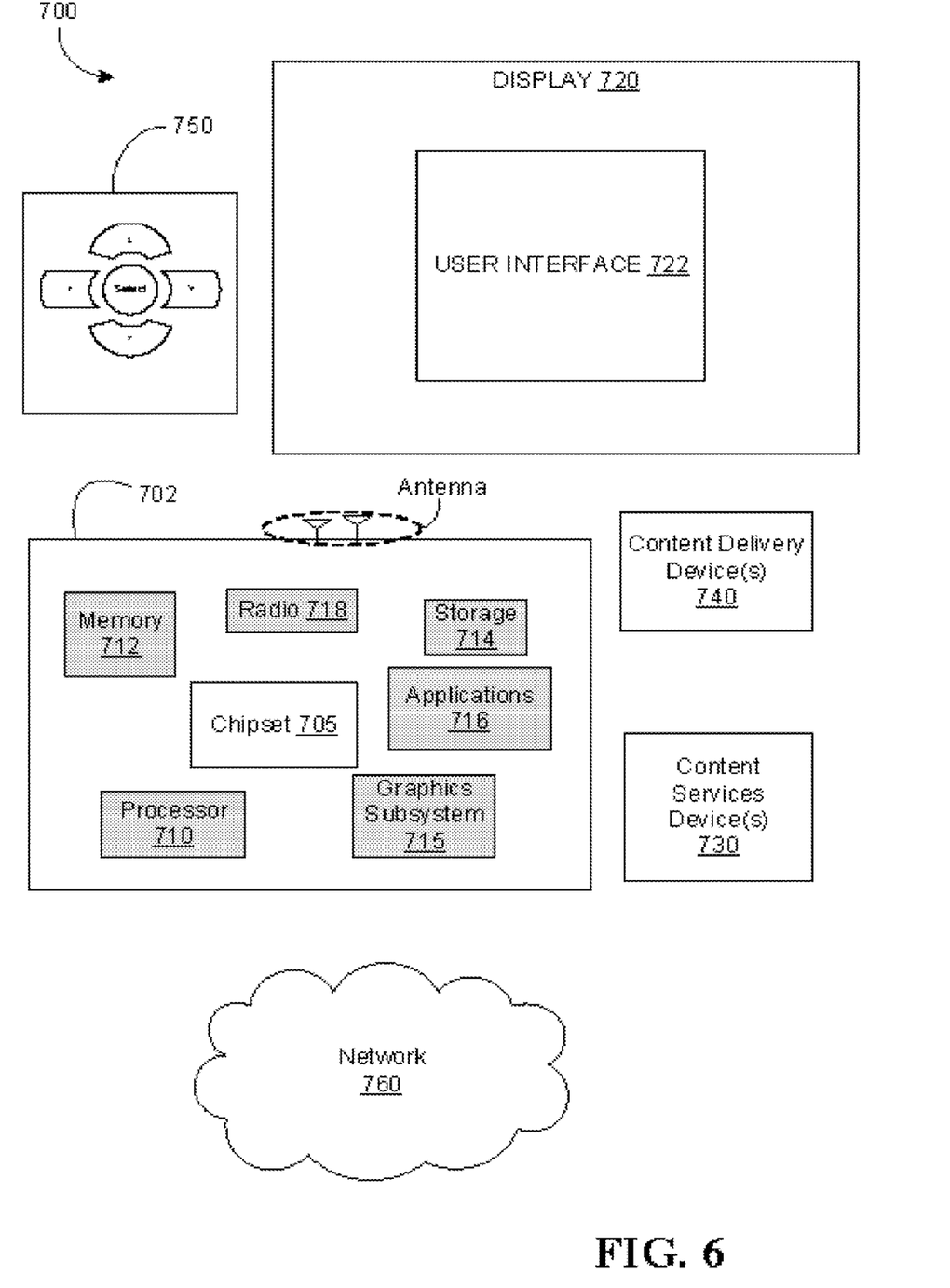
FIG. 6 is a block diagram of an example of a system having a navigation controller according to an embodiment.

FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to display video bitstreams as described herein.

In embodiments, the system 700 comprises a platform 702 coupled to a display 720. Platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include the content creator utility 18 (FIG. 1), already discussed. In addition, the processor 710 may be configured to execute the OS 48 (FIG. 3), already discussed, via instructions obtained from the memory 712, the storage 714 or other suitable source. An analog or digital interface may be used to communicatively couple graphics subsystem 715 and display 720. For example, the interface may be any of a High-Definition Multimedia Interface, DisplayPort, wireless HDMI, and/or wireless HI) compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
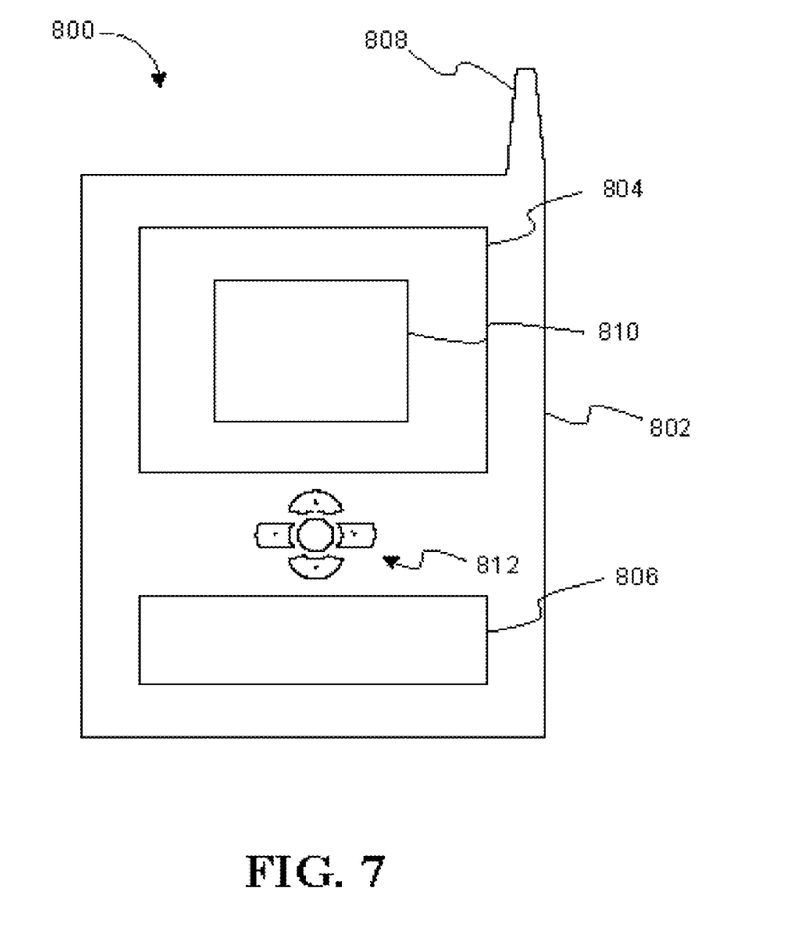
FIG. 7 is a block diagram of an example of a system having a small form factor according to an embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Thus, techniques described herein may enable the generation of thumbnail images for a wide variety of video content. Moreover, the same thumbnail images may be created regardless of the OS decoder being used. In addition, techniques described herein can reduce power consumption, extend battery life, and reduce display time.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASICs), programmable logic devices (PLDs), digital signal processors (DSPs), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk. Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
storing a video file including a plurality of frames, said frames including I-frames;
causing a plurality of the I-frames to be displayed to a user for modification of the video file;
receiving a user selection of one of said displayed I-frames as a source for generating a thumbnail image representing contents of the entire video file;
in response to the user selection, generating a thumbnail pointer identifying said selected I-frame as the source for generating the thumbnail image, the thumbnail pointer located at a predetermined location within the video file known to a plurality of the browsers so that said file browsers can access the selected I-frame without decoding any other frames of said video file;
receiving, at a browser in the plurality of the browsers, a request to access the video file;
in response to the received request, the browser accessing the predetermined location in the video file to read the thumbnail pointer;
the browser accessing the selected I-frame using the thumbnail pointer read from the predetermined location in the video file; and
the browser generating the thumbnail image using the selected I-frame accessed using the thumbnail pointer.

2. The method of claim 1 including storing said thumbnail pointer outside of a header of said video file.

3. The method of claim 2 including storing said thumbnail pointer in a header of said video file.

4. One or more non-transitory computer readable media storing instructions to perform a sequence comprising:
storing a video file including a plurality of frames, said frames including I-frames;
causing a plurality of the I-frames to be displayed to a user for modification of the video file;
receiving a user selection of one of said displayed I-frames as a source for generating a thumbnail image to represent contents of the entire video file;
in response to the user selection, generating a thumbnail pointer identifying said selected I-frame as the source for generating the thumbnail image, the thumbnail pointer located at a predetermined location within the video file known to a plurality of file browsers so that said file browsers can access the selected I-frame without decoding any other frames of said video file;
receiving a request, at a browser in the plurality of file browsers to access the video file;
in response to the received request, the browser accessing the predetermined location with the video file to read the thumbnail pointer;
accessing the selected I-frame using the thumbnail pointer read from the predetermined location in the video file; and
generating the thumbnail image using the selected I-frame accessed using the thumbnail pointer.

5. The media of claim 4, further storing instructions to perform a sequence including storing said thumbnail pointer outside of a header of said video file.

6. The media of claim 5, further storing instructions to perform a sequence including storing said thumbnail pointer in a header of said video file.

7. An apparatus comprising:
a processor to:
store a video file including a plurality of frames, said frames including I-frames, cause a plurality of the I-frames to be displayed to a user for modification of the video file, receive a user selection of one of said displayed I-frames as a source for generating a thumbnail image to represent contents of the entire video file, in response to the user selection, generate a thumbnail pointer identifying said selected I-frame as the source for generating the thumbnail image, the thumbnail pointer located at a predetermined location within the video file known to a plurality of file browsers so that said file browsers can access the selected I-frame without decoding any other frames of said video file, receive a request at a browser in the plurality of file browsers to access the video file, in response to the received request, the browser accessing the predetermined location with the video file to read the thumbnail pointer, access the selected I-frame using the thumbnail pointer read from the predetermined location in the video file, and generate the thumbnail image using the selected I-frame accessed using the thumbnail pointer; and
a memory coupled to said processor.

8. The apparatus of claim 7, said processor to store said thumbnail pointer outside of a header of said video file.

9. The apparatus of claim 8, said processor to store said thumbnail pointer in said header of said video file.

10. A system comprising:
a processor to:
store a video file including a plurality of frames, said frames including I-frames, cause a plurality of the I-frames to be displayed to a user for modification of the video file, receive a user selection of one of said displayed I-frames as a source for generating a thumbnail image to represent contents of the entire video file, in response to the user selection, generate a thumbnail pointer identifying said selected I-frame as the source for generating the thumbnail image, the thumbnail pointer located at a predetermined location within the video file known to a plurality of file browsers so that said file browsers can access the selected I-frame without decoding any other frames of said video file;
receive a request at a browser in the plurality of file browsers to access the video file, in response to the received request, the browser accessing the predetermined location with the video file to read the thumbnail pointer, access the selected I-frame using the thumbnail pointer read from the predetermined location in the video file, and generate the thumbnail image using the selected I-frame accessed using the thumbnail pointer; and
a battery to provide power to the system.

11. The system of claim 10, said processor to store said thumbnail pointer outside of a header of said video file.

12. The system of claim 11, said processor to store said thumbnail pointer in header of said video file.

* * * * *

UNITED STATES PATENT AND TRADEMARK OFFICE
CERTIFICATE OF CORRECTION

PATENT NO. : 10,777,231 B2
APPLICATION NO. : 16/161700
DATED : September 15, 2020
INVENTOR(S) : Bo Zhao, Yunbiao Lin and Yue Xiong Page 1 of 1

It is certified that error appears in the above-identified patent and that said Letters Patent is hereby corrected as shown below:

In the Claims

Column 11:
Line 22, "the browsers" should be --file browsers--;
Line 25, "the browsers" should be --file browsers--.

Signed and Sealed this
Twentieth Day of October, 2020

Andrei Iancu
*Director of the United States Patent and Trademark Office*